US006206045B1

(12) United States Patent
Hayashi et al.

(10) Patent No.: US 6,206,045 B1
(45) Date of Patent: Mar. 27, 2001

(54) MANIFOLD SOLENOID VALVE DRIVEN BY SERIAL SIGNALS

(75) Inventors: Bunya Hayashi; Fumio Morikawa; Katsuhisa Endo, all of Ibaraki (JP)

(73) Assignee: SMC Corporation, Tokyo (JP)

( * ) Notice: Subject to any disclaimer, the term of this patent is extended or adjusted under 35 U.S.C. 154(b) by 0 days.

(21) Appl. No.: 09/522,109

(22) Filed: Mar. 9, 2000

(30) Foreign Application Priority Data

Mar. 31, 1999 (JP) ........................................... 11-092391

(51) Int. Cl.$^{7}$ ........................................... F16K 11/10
(52) U.S. Cl. ........................................... 137/884; 137/269
(58) Field of Search ........................................... 137/884, 269

(56) References Cited

U.S. PATENT DOCUMENTS

| | | | |
|---|---|---|---|
| 4,854,346 | 8/1989 | Nakanishi et al. . | |
| 5,348,047 * | 9/1994 | Stoll et al. | 137/554 |
| 5,519,636 | 5/1996 | Stoll et al. . | |
| 5,699,830 | 12/1997 | Hayashi et al. . | |
| 5,887,623 * | 3/1999 | Nagai et al. | 137/884 |
| 5,915,666 | 6/1999 | Hayashi et al. . | |
| 5,918,629 | 7/1999 | Hayashi et al. . | |
| 6,053,198 * | 4/2000 | Atkin et al. | 137/315 |

FOREIGN PATENT DOCUMENTS

| | | |
|---|---|---|
| 0 603 395 | 6/1994 | (EP) . |
| 0 860 609 | 8/1998 | (EP) . |
| WO 94/04831 | 3/1994 | (WO) . |

* cited by examiner

*Primary Examiner*—John Fox
(74) *Attorney, Agent, or Firm*—Oblon, Spivak, McClelland, Maier & Neustadt, P.C.

(57) ABSTRACT

A manifold solenoid valve drive-controlled by serial signals permits extremely easy assembly and easy maintenance, and eliminates a possibility of erroneous wiring. For this purpose, compressed air is supplied and exhausted through manifold blocks 30 on which solenoid valves 20 are mounted and which are consecutively connected, and serial signals are transmitted to the respective solenoid valves. A fluid passage section 31 of the manifold block is provided with common passages 32 and 33 for air supply and exhaust that penetrate the respective manifold blocks 30, and channels 36 through 38 that communicate them with supply/discharge openings of the solenoid valves 20. In an electric circuit section 41 of the manifold block, a printed circuit board 45, which has connecting terminals 46*a* and 46*b* for transmitting serial signals, slave chips 47 for extracting operation signals for the solenoid valves from serial signals, and a feeder terminal 49 for supplying power to the solenoid valves 20 based on the operation signals, is accommodated. Assembling the manifold solenoid valve 10 completes communication of the passages and electrical connection.

2 Claims, 5 Drawing Sheets

1
2
3
4
5
6
7
8
10
20
30
50
60
70
72
72a
73

3
5
2
4
4b
4a
24V
GND
S1
S2
70
74C
46b
45
46a
10
72
75
76
47
60
77
79
78
73
76a
49
25
26
20
10A
72A
70A
73A

MANIFOLD SOLENOID VALVE DRIVEN BY SERIAL SIGNALS

FIELD OF THE INVENTION

The present invention relates to a manifold solenoid valve drive-controlled by serial signals.

DESCRIPTION OF THE RELATED ART

Conventionally, a manifold solenoid valve provided with a required number of solenoid valves, manifold blocks on which the solenoid valves are individually mounted and which are interconnected, and an air supply/exhaust block that supplies and exhausts compressed air through the manifold blocks has been extensively used. The manifold solenoid valve that can be drive-controlled by serial signals is required to be configured so that it can be assembled as easily as a conventional manifold solenoid valve.

DISCLOSURE OF THE INVENTION

A technological object of the present invention is to configure such a manifold solenoid valve so that it can be assembled with great ease as a conventional manifold solenoid valve in implementing drive control of the manifold solenoid valve by serial signals.

Another technological object of the present invention is to provide a manifold solenoid valve driven by serial signals that permits extremely easy maintenance and eliminates a possibility of erroneous wiring.

A manifold solenoid valve in accordance with the present invention for fulfilling the aforesaid objects is a manifold solenoid valve in which an operation is controlled by serial signals, and which is basically provided with a required number of solenoid valves, manifold blocks on which the solenoid valves are individually mounted and are interconnected, an air supply/exhaust block that supplies and exhausts compressed air through the manifold blocks, and a relay unit that relays serial signals for operation control that are supplied to the respective solenoid valves through the manifold blocks. And the manifold blocks are provided with fluid passage sections and electric circuit sections.

In the manifold blocks, the fluid passage sections are provided with common passages for air supply and exhaust that penetrate the manifold blocks for communication with the air supply/exhaust block, and channels for placing the common passages in communication with supply/exhaust openings of the solenoid valves. The electric circuit sections accommodate electric circuit components that have female and male connecting terminals for transmitting serial signals that are electrically interconnected, slave chips for extracting operation signals for the solenoid valves from serial signals, and feeder terminals for feeding power to the solenoid valves according to the operation signals that are mounted on printed circuit boards.

Regarding the electric circuit components, the female and male connecting terminals on the printed circuit boards in adjacent manifold blocks are provided at positions where they are interconnected as soon as the common passages are communicated with each other when the manifold blocks are connected, and the feeder terminals on the printed circuit boards are provided at positions where the feeder terminals are jutted out to openings in top surfaces of the manifold blocks and interconnected with power receiving terminals provided on the solenoid valves as soon as the solenoid valves and the channels of the fluid passage sections are communicated when the solenoid valves are mounted on the manifold blocks.

In the manifold solenoid valve described above, fitting the printed circuit boards in mounting grooves in the electric circuit sections of the manifold blocks makes it possible to arrange the female and male connecting terminals disposed back-to-back at opposing plate edges on the printed circuit boards and the feeder terminals jutted out to the openings in the top surfaces of the manifold blocks at predetermined locations in the manifold blocks.

In the manifold solenoid valve driven by serial signals that has the configuration set forth above, when adjacent manifold blocks are connected in sequence to communicate the common passages of the fluid passage sections thereof with one another, the female and male connecting terminals for transmitting serial signals that are provided on the printed circuit boards fitted in the electric circuit sections in the respective manifold blocks are interconnected. Furthermore, the moment the individual solenoid valves are mounted on the respective manifold blocks and the supply/exhaust openings in the solenoid valves and the channels in the fluid passage sections of the manifold blocks are communicated with one another, the feeder terminals which feed power to the solenoid valves based on operation signals supplied in the form of serial signals and which are provided on the top surfaces of the respective manifold blocks are interconnected with the power receiving terminals provided on the respective solenoid valves.

Thus, simply stacking and connecting the manifold blocks automatically connects fluid passages and serial signal lines. Moreover, simply mounting the solenoid valves on the manifold blocks forms the passages between the solenoid valves and the manifold blocks, and the electric circuits that drive the solenoid valves based on serial signals.

Hence, in controlling the drive of the manifold solenoid valve by serial signals, the manifold solenoid valve can be assembled with great ease as a conventional manifold solenoid valve. In addition, an electrical control system is concentrated in the electric circuit component, thus permitting extremely easy maintenance and eliminating a possibility of erroneous wiring.

Moreover, a configuration required for the aforesaid electrical connection in the manifold blocks, namely, the female and male connecting terminals on junction surfaces and the feeder terminals on the top surfaces, can be obtained simply by fitting the printed circuit boards in the mounting grooves in the electric circuit sections of the manifold blocks.

DETAILED DESCRIPTION

Figure 1:
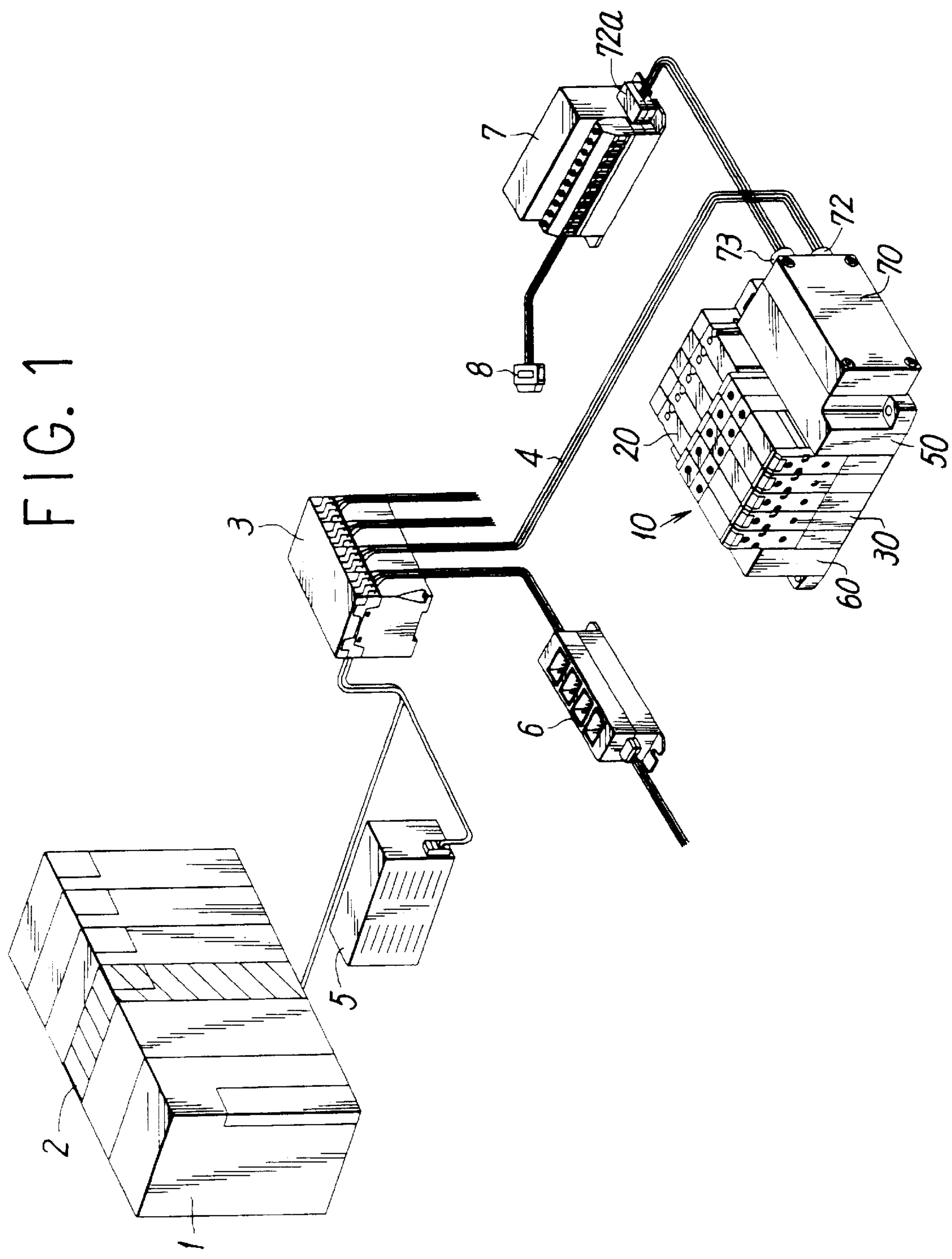
FIG. 1 is a perspective view showing an exemplary configuration of a control system for driving a manifold solenoid valve in accordance with the present invention by serial signals.

FIG. 1 shows an exemplary configuration of a control system for driving a manifold solenoid valve in accordance with the present invention by serial signals.

In the control system, serial signals are transmitted from a serial communication unit 2, an operation of which is controlled by a control unit 1, through a dedicated cable 4 via a gateway 3, to a manifold solenoid valve 10 and other equipment via a connector 6 as necessary. Drive power from a power unit 5 can be supplied together with the foregoing serial signals transmitted through the gateway 3 or supplied separately therefrom. An end unit 8 can be connected to the manifold solenoid valve 10 after connecting an analog device 7 or the like as necessary.

Figure 2:
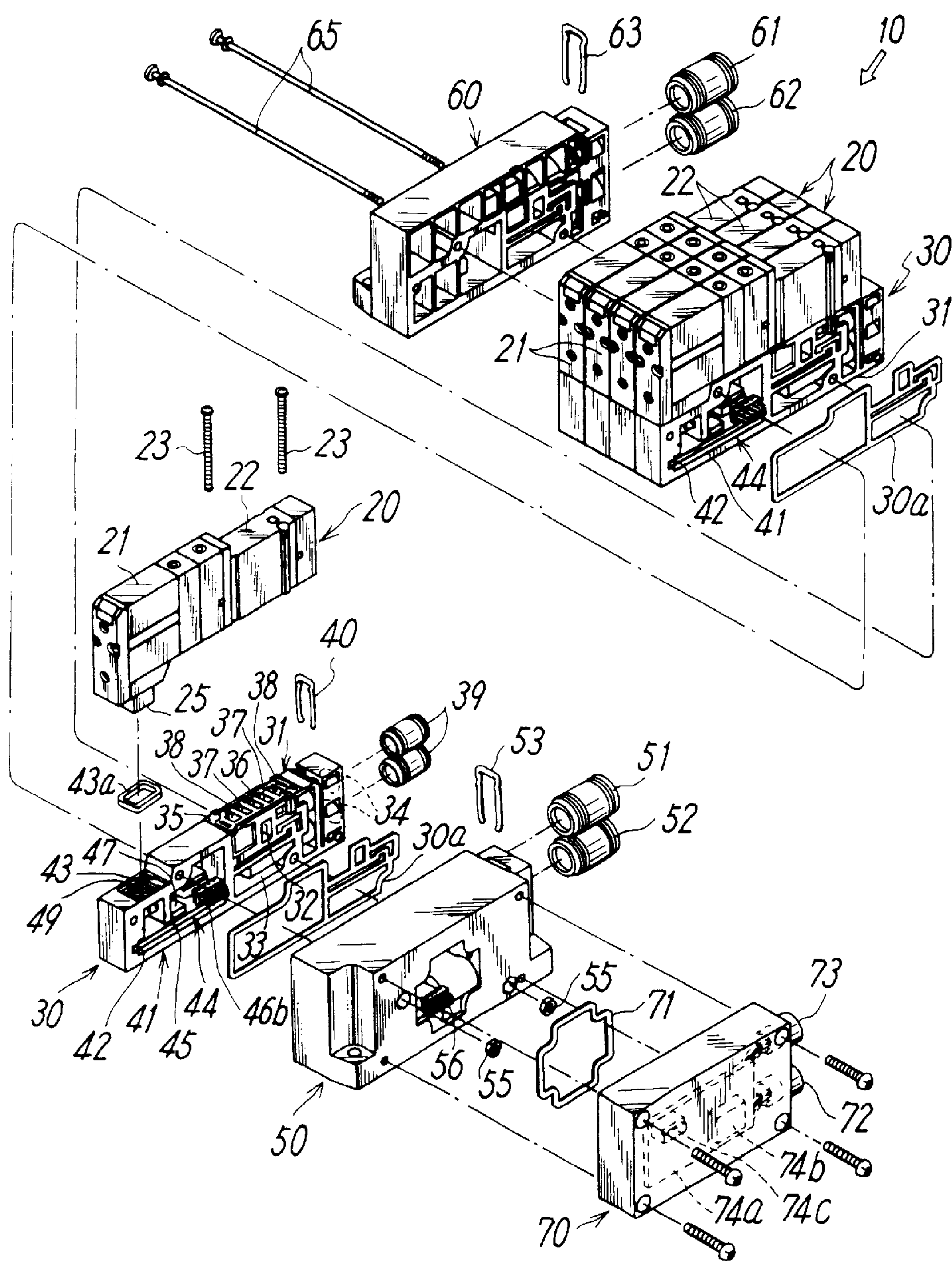
FIG. 2 is an assembly view showing an embodiment of the manifold solenoid valve in accordance with the present invention.

FIG. 2 shows an embodiment of the manifold solenoid valve 10 in accordance with the present invention, an operation of which is controlled by the foregoing serial signals.

The manifold solenoid valve 10 is equipped with three-port or five-port solenoid valves 20 in a quantity required for various applications, a required quantity of manifold blocks 30 on which the solenoid valves 20 are individually mounted and which are interconnected, a supply/exhaust block 50 which is provided at one end of the connected manifold blocks 30 and which supplies and exhausts compressed air through the manifold blocks 30, an end block 60 provided at the other end of the connected manifold blocks 30, and a relay unit 70 which is attached to the supply/exhaust block 50 and which relays serial signals for operation control to be sent to the respective solenoid valves 20 from the gateway 3 through the manifold blocks 30.

The solenoid valve 20 is equipped with a single or a plurality of solenoids therein, and drives a three-port or five-port main valve 22 via a pilot valve 21, which is electromagnetically driven by the solenoids, or directly by the solenoids to thereby switch between air supply and exhaust in the main valve 22. The solenoid valves 20 are secured onto the manifold blocks 30 by using mounting screws 23. The solenoid valve 20 is provided with a receiving terminal 25 electrically connected to a feeder terminal 49, which will be discussed hereinafter, when it is fixed on the manifold block 30. The solenoid valves 20 employ common manifold blocks 30 regardless of whether the solenoid valves 20 are of the three-port or five-port type, so that they can be constructed to have the same external shape, being different only in internal mechanism.

The manifold block 30 is provided with a fluid passage section 31 and an electric circuit section 41. The two sections 31 and 41 may be formed into one piece by a synthetic resin or the like, or may be separately formed and then combined into one piece.

A passage provided in the fluid passage section 31 of the manifold block 30 is comprised primarily of, as in the case of a well-known manifold block, a common passage 32 for air supply and a common passage 33 for exhaust which penetrate the manifold blocks 30 to establish mutual communication with a passage (not shown) in the supply/exhaust block 50, and output passages that supply and discharge an output fluid from the solenoid valves 20 to two output ports 34 and 34 provided in one end surface of the manifold block 30. As necessary, a passage for supply and discharge for a pilot valve is additionally provided. Furthermore, a supply channel 36, output channels 37, exhaust channels 38, etc. for establishing communication between the common passages and the output passages, or the passage for supply/discharge for a pilot valve and supply/discharge openings provided in a mounting surface of the manifold block 30 in the solenoid valve 20 are provided in a solenoid valve mounting surface 35 at a top.

Output port couplers 39 and 39 attached to the output ports 34 and 34 are provided with locking grooves around themselves. The locking grooves are fitted in the output ports 34 and 34 of the manifold block 30, and legs of a U-shaped pin 40 inserted from above the manifold block 30 are engaged with the locking grooves for a securing purpose.

Figure 3:
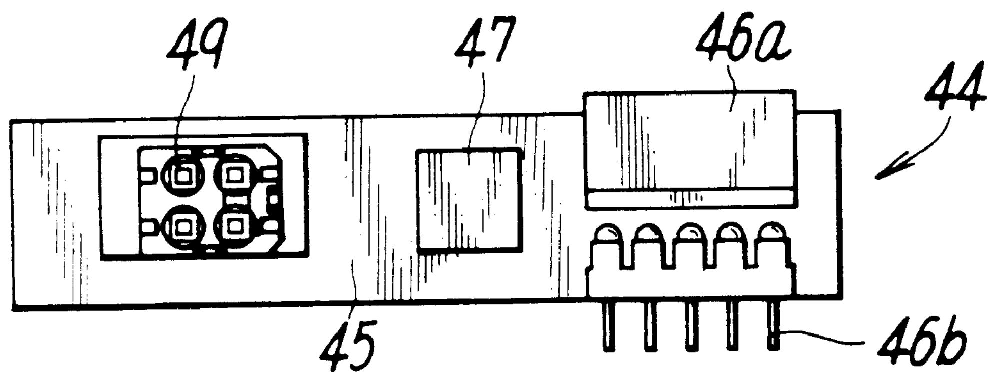
FIG. 3 is a top plan view of an electric circuit component mounted on the manifold solenoid valve.
Figure 4:
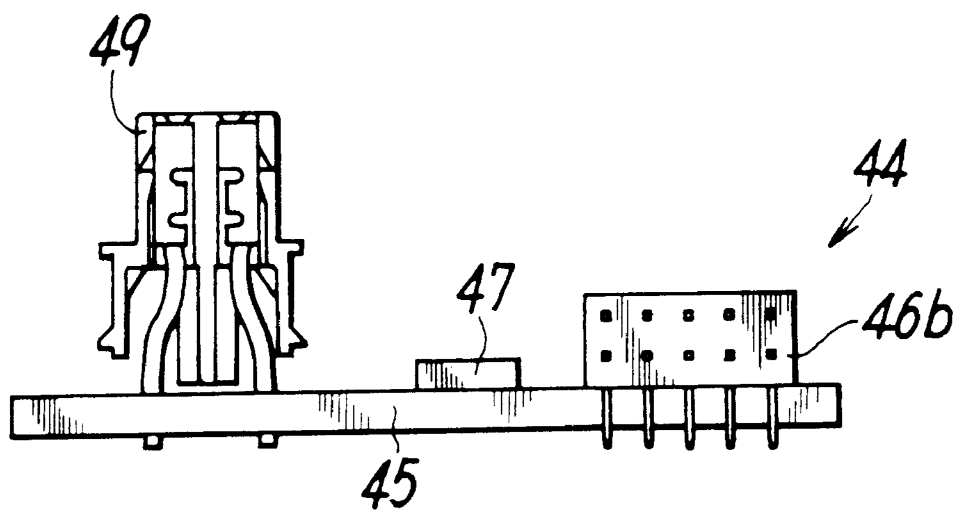
FIG. 4 is a side view of the electric circuit component shown in FIG. 3.

The electric circuit section 41 accommodates an electric circuit component 44 therein. As shown in FIG. 3 and FIG. 4, the electric circuit component 44 is provided with female and male connecting terminals **46*a* and 46*b* for transmitting serial signals, a slave chip 47 for extracting operation signals for the solenoid valves 20 from serial signals, and the feeder terminal 49 for supplying power to the solenoid valves 20 based on the operation signals, which are all mounted on a printed circuit board 45 and are electrically interconnected by printed wiring on the printed circuit board 45. In the electric circuit component 44, as shown in FIG. 2, a mounting groove 42 for the printed circuit board 45 is formed in the electric circuit section 41 of the manifold block 30, and the printed circuit board 45 is fitted in the mounting groove 42 and fixed in a predetermined position to be thereby fixedly installed to the electric circuit section 41. It is suited for the printed circuit board 45 to be fixed by screws or the like or stably and detachably fixed by, for example, providing it with a member that elastically engages with the mounting groove 42 when the printed circuit board 45 is inserted in a predetermined position of the mounting groove 42. A flexible circuit board may be used for the printed circuit board 45**.

The female and male connecting terminals **46*a* and 46*b* on the printed circuit boards 45 in the adjoining manifold blocks 30 are disposed back-to-back at opposing plate edges on the printed circuit boards 45. Thus, when the printed circuit board 45 is fitted in the predetermined position, the female and male connecting terminals 46*a* and 46*b* are provided outwardly at predetermined positions of a surface where the manifold blocks 30 are interconnected. When adjoining manifold blocks 30 are connected at the surface where they are joined to one another by the positioning, the female and male connecting terminals 46*a* and 46*b* in the adjoining manifold blocks 30 are interconnected as soon as the common passages 32 and 33 in the manifold blocks 30** are communicated with one another.

An opening 43 for a feeder terminal is provided in a top surface of the electric circuit section 41 in the manifold block 30, and the feeder terminal 49 on the printed circuit board is jutted out to the opening 43. The feeder terminal 49 may be fixedly provided on the printed circuit board 45, or semi-fixedly provided to permit positional adjustment by installing it via a member that is flexible to a certain extent, or connected via a flexible lead wire connected at a predetermined position of the printed circuit board 45, provided that the feeder terminal 49 is disposed at a position where it projects to the opening 43 when the printed circuit board 45 is fitted at a predetermined position of the mounting groove 42 in the electric circuit section 41, or the feeder terminal 49 is disposed at a position where it faces the opening 43 and fixed there by an appropriate means.

Thus, by providing the feeder terminal 49 at a position where it faces the opening 43 in the top surface of the manifold block 30, the feeder terminal 49 is provided at the predetermined position on the manifold block 30. More specifically, when the solenoid valve 20 is mounted on the solenoid valve mounting surface 35 on the manifold block 30 via a gasket, and the supply/discharge opening provided in the solenoid valve 20 is communicated with the supply channel 36, the output channel 37, the exhaust channel 38, etc. opened in the fluid passage 31, the feeder terminal 49 is disposed at the position where it is interconnected with the receiving terminal 25 provided on the solenoid valve 20. When the feeder terminal 49 and the receiving terminal 25 are connected, a connector gasket 43*a* is placed around the opening 43 to seal the electrically connected portion.

A plurality of the manifold blocks 30 described above are connected. The supply/exhaust block 50 for supplying and exhausting compressed air through the connected manifold blocks 30 is provided on one end of the connected manifold blocks 30 and the end block 60 is provided at the other end.

The supply/exhaust block 50 is provided with an air supply coupler 51 and an exhaust coupler 52 on its one end surface. The air supply coupler 51 and the exhaust coupler 52 are communicated with the common passage 32 for air supply and the common passage 33 for exhaust that penetrate the respective manifold blocks 30 to supply air from outside to the common passage 32, and air from the respective solenoid valves 20 is exhausted through the common passage 33. The supply/exhaust couplers 51 and 52 are fixed by engaging legs of a U-shaped pin 53 inserted from above the supply/exhaust block 50 with locking grooves provided around peripheries of the couplers 51 and 52, as in the case of the output port coupler 39 mentioned above. Although not shown, a surface of the supply/exhaust block 50 where it is joined to the manifold block 30 is provided with a female connecting terminal connected to the male connecting terminal 46*b* provided on the manifold block 30, and a male connecting terminal 56 electrically connected therewith is further provided on an outer surface of the block 50.

The end block 60 is positioned at either end of the manifold blocks 30 consecutively installed together with the supply/exhaust block 50, and they are connected by tension bolts 65 and fixing nuts 55. The end block 60 also closes ends of the common passages 32 and 33, etc. provided such that they penetrate the manifold blocks 30. At the time of connection, gaskets 30*a* are installed between the respective manifold blocks 30 and between the manifold block 30, the supply/exhaust block 50, and the end block 60 so as to individually seal the fluid passage section 31 and the electric circuit section 41 in the manifold block 30. The gaskets 30*a* may be installed, taking the fluid passage section 31 and the electric circuit section 41 as discrete units in the manifold block 30.

Furthermore, in the end block 60, an air supply coupler 61 and an exhaust coupler 62 can be provided in addition to the supply coupler 51 and the exhaust coupler 52 in the supply/exhaust block 50. In this case also, the two couplers 61 and 62 are fixed using a U-shaped pin 63 inserted from above the end block 60. Although not shown, the end unit 8 (refer to FIG. 1) can be accommodated in the end block 60.

A relay unit 70 attached to the supply/exhaust block 50 via a gasket 71 in a sealed state relays serial signals for operation control from the gateway 3 to be sent to the respective solenoid valves 20 through the manifold blocks 30, and functions to receive and transmit the serial signals. The relay unit 70 is equipped with serial signal connecting terminals 72 and 73 for receiving and transmitting. In the relay unit 70, a required electric or electronic component 74*b* and a female connecting terminal 74*c* for transmitting serial signals that is connected to the male connecting terminal 56 in the supply/exhaust block 50 are provided on a printed circuit board 74*a*.

Figure 5:
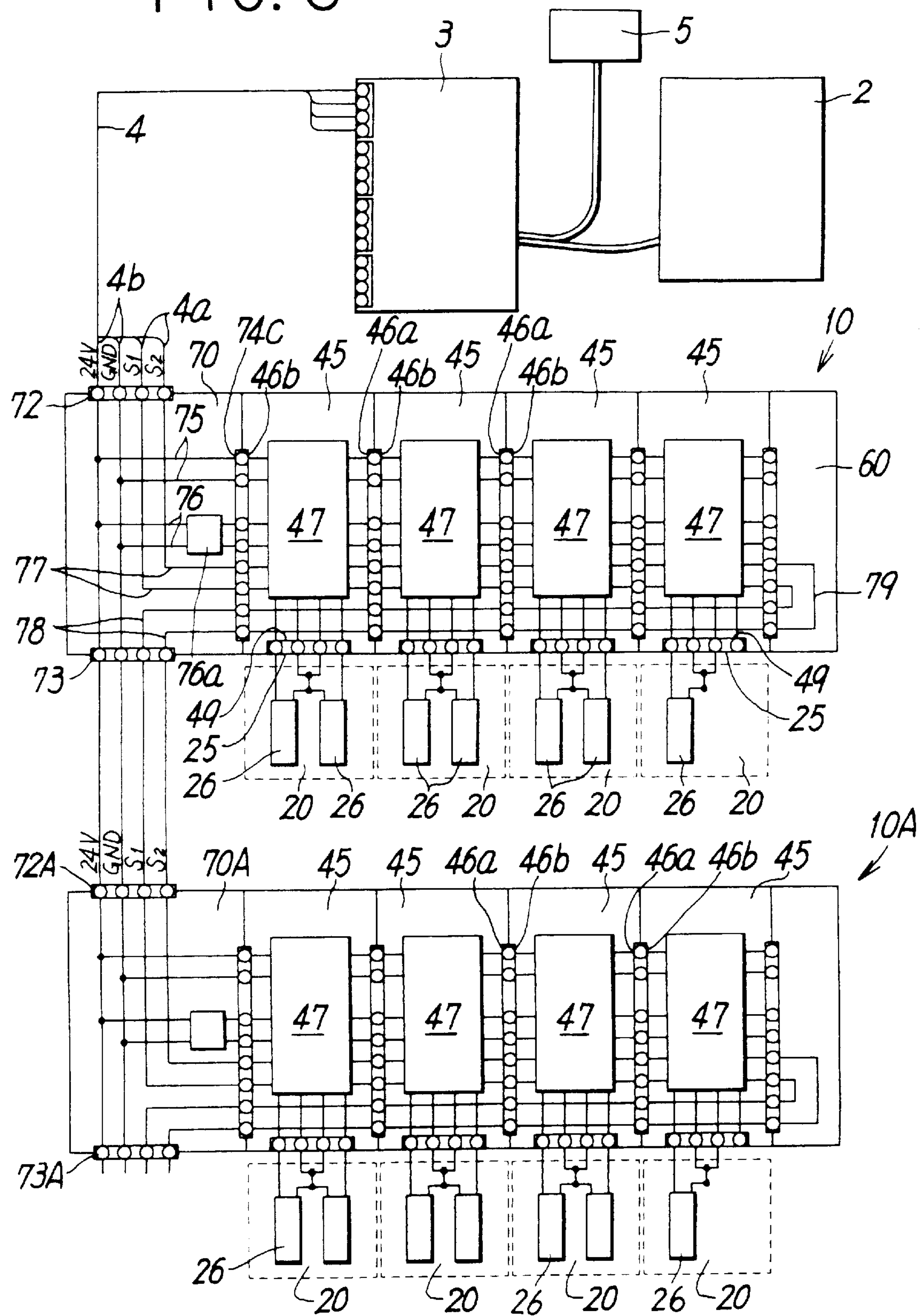
FIG. 5 is a schematic explanatory view showing an outline of signal lines in a relay unit and manifold blocks in the control system of the manifold solenoid valve.

FIG. 5 schematically shows signal lines in the relay unit 70 and the manifold blocks 30 in the control system of the manifold solenoid valve 10. In the control system, as described in conjunction with FIG. 1 previously, serial signals and power signals are transmitted via the gateway 3 from the serial communication unit 2 and the power unit 5, and further transmitted via the receiving connecting terminal 72 to the relay unit 70 provided in the manifold solenoid valve 10 through the dedicated cable 4 comprised of a serial signal line 4*a* and a power signal line 4*b*. The drive power from the power unit 5 can alternatively be supplied separately from serial signals transmitted through the gateway 3. As necessary, a transmitting end of the relay unit 70 can be connected to a similar relay unit 70A of a manifold solenoid valves 10A or other analog equipment 7, etc. in succession via connecting terminals 73 and 72A, and their transmitting ends can be also connected to other equipment, etc. via the connecting terminal 73A.

Serial signals introduced into the relay unit 70 are transmitted from the female connecting terminal 74*c* provided therein to slave chips 47 on the printed circuit board 45, which is accommodated in the manifold block 30, via the supply/exhaust block 50, which is omitted in FIG. 5, (see FIG. 1 and FIG. 2) and further via the male connecting terminal 46*b* of the manifold block 30 adjacent to the block 50. Operation outputs for supplying or cutting off power to the solenoid valves 20 mounted on the individual manifold blocks 30 are provided by switching operation of an output circuit based on serial signals in the respective slave chips 47. The outputs are transmitted to the respective solenoid valves 20 from the feeder terminals 49 via the receiving terminals 25 of the solenoid valves 20. The serial signals are transmitted in sequence to the slave chips 47, which control the operations of the solenoid valves 20 in the following stage, via the female and male connecting terminals 46*a* and 46*b*.

Solenoids 26 provided on the solenoid valves 20 function to operate pilot valves. Two solenoids 26 provided on a single solenoid valve 20 make up a double solenoid valve (normally a five-port valve), and only one solenoid 26 provided on the single solenoid valve 20 makes up a single solenoid valve (normally a three-port valve).

Transmission lines 75 connected to the slave chips 47 are power lines for driving solenoid valves, transmission lines 76 are control power lines connected via a 5V power source 76*a*, transmission lines 77 are signal lines for transmitting serial signals, and transmission lines 78 are return signal lines for serial signals. In the drawing, reference numeral 79 denotes a short-circuit line provided in the end block 60.

A control system in the manifold solenoid valve 10 connected via the connecting terminals 73 and 72A to the transmitting end of the relay unit 70 provided in the manifold solenoid valve 10 is substantially the same as the manifold solenoid valve 10. Hence, primary identical or equivalent parts will be assigned like reference numerals, and descriptions thereof will be omitted.

The relay unit 70 of FIG. 2 can be attached to either one or both of the supply/exhaust block 50 and the end block 60, or can be made integral with the supply/exhaust block 50 or the end block 60.

Figure 6:
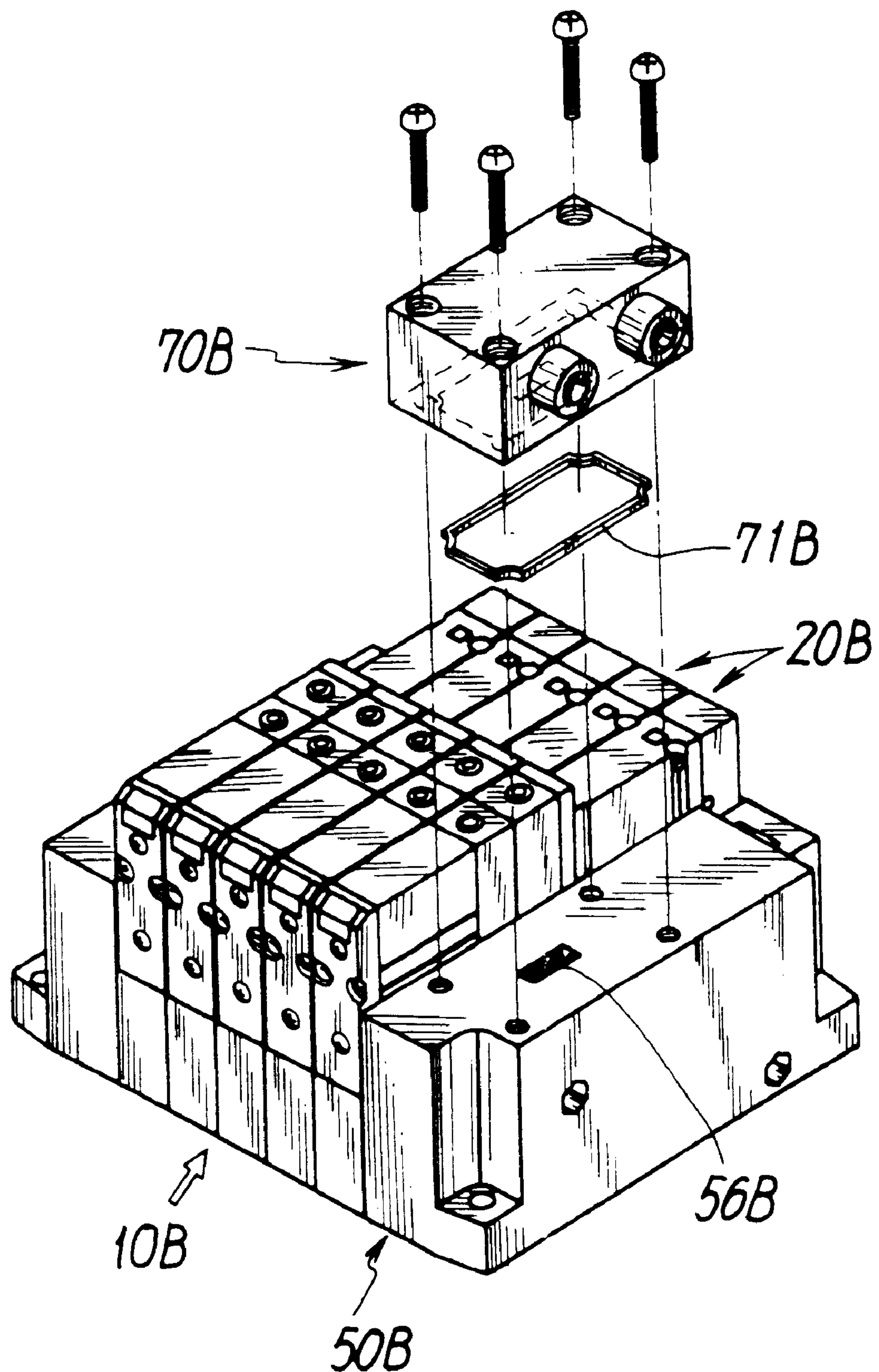
FIG. 6 is a partly assembly view showing a configuration of another embodiment of the manifold solenoid valve in accordance with the present invention.

FIG. 6 shows a manifold solenoid valve 10B wherein a relay unit 70B is provided on a supply/exhaust block 50B. In this manifold solenoid valve 10B, a configuration of the supply/exhaust block 50B is identical to the embodiment of FIG. 2 discussed above except that a male connecting terminal 56B is provided on the supply/exhaust block 50B, and a configuration of the relay unit 70B is identical to the embodiment of FIG. 2 discussed above except that the relay unit 70B is installed on the supply/exhaust block 50B via a gasket 71B. With this arrangement, the relay unit 70B can be mounted on the supply/exhaust block 50B such that it is virtually as high as the solenoid valves 20B, permitting the whole assembly to be compact.

Thus, according to the manifold solenoid valve driven by serial signals in accordance with the present invention, in achieving control of the drive of the manifold solenoid valve by serial signals, the manifold solenoid valve can be assembled with great ease as a conventional manifold solenoid valve. In addition, the constituent sections can be easily disassembled, thus permitting extremely easy maintenance and eliminating a possibility of erroneous wiring.

What is claimed is:

1. A manifold solenoid valve, comprising:

a plurality of solenoid valves;

a plurality of manifold blocks having fluid passage sections and electric circuit sections, the solenoid valves being individually mounted and interconnected on to corresponding manifold blocks;

an air supply/exhaust block that supplies an exhausts compressed air through the an air supply/exhaust block connected with the manifold blocks and having a supply portion and an exhaust portion configured to supply and exhaust compressed air through the manifold blocks; and a relay unit configured to relay serial operation control signals to the manifold blocks, wherein the fluid passage sections each include common passages for air supply and exhaust that penetrate through each of the manifold blocks and are positioned to be in communication with each other and with the respective supply portion and exhaust portion of the air supply/exhaust block, and channels for placing the common passages of each fluid passage section in communication with supply/exhaust openings of the corresponding one of the solenoid valves individually mounted thereon and interconnected therewith, and the electric circuit sections each having a printed circuit board including mounted electric circuit components comprising, electrically interconnected connecting terminals positioned on opposite sides of each of the manifold blocks and configured to be interconnected with one of the connecting terminals of an adjacent one of the interconnected manifold blocks, slave chips configured to extract serial operation control signals for the corresponding one of the solenoid valves from the serial operation control signals relayed from the relay unit, and feeder terminals configured to feed power to power receiving terminals provided on the corresponding one of the solenoid valves individually mounted on and interconnected with the manifold blocks according to the serial operation control signals extracted by the slave chips, the feeder terminals being jutted out to openings in top surfaces of the manifold blocks and there connected with the power receiving terminals.

2. The manifold solenoid valve arrangement according to claim 1, wherein fitting the printed circuit boards in mounting grooves in the electric circuit sections of the manifold blocks arranges the female and male connecting terminals disposed back-to-back at opposing plate edges on the printed circuit boards and causes the feeder terminals to jut out to the openings in the top surfaces of the manifold blocks at predetermined locations in the manifold blocks.

* * * * *